United States Patent [19]
Babin

[11] 3,901,448
[45] Aug. 26, 1975

[54] IRRIGATION SYSTEM EMITTERS WITH RENEWABLE FILTERS

[76] Inventor: Benton P. Babin, 1226 Dauphine St., New Orleans, La. 70116

[22] Filed: Mar. 4, 1974

[21] Appl. No.: 447,942

[52] U.S. Cl. .................... 239/145; 61/13; 239/542
[51] Int. Cl.² .................... B05B 15/00; A01G 27/00
[58] Field of Search ........ 239/145, 450, 542; 61/12, 61/13; 47/48.5

[56] References Cited
UNITED STATES PATENTS

| 953,080 | 3/1910 | Wiggins | 239/450 X |
|---|---|---|---|
| 2,798,768 | 7/1957 | Babin | 239/145 |
| 3,046,747 | 7/1962 | Timpe | 61/13 |
| 3,518,831 | 7/1970 | Tibbals et al. | 239/542 X |
| 3,604,728 | 9/1971 | Symcha et al. | 61/12 X |
| 3,797,754 | 3/1974 | Spencer | 239/542 |
| 3,804,334 | 4/1974 | Curry | 239/542 X |
| 3,806,031 | 4/1974 | Olson | 239/542 X |
| 3,840,182 | 10/1974 | Geffroy | 239/145 |

FOREIGN PATENTS OR APPLICATIONS

| 23,798 | 4/1936 | Australia | 61/12 |
|---|---|---|---|
| 100,530 | 12/1964 | Denmark | 239/145 |

Primary Examiner—M. Henson Wood, Jr.
Assistant Examiner—Randolph A. Reese
Attorney, Agent, or Firm—Dennison, Dennison, Townshend & Meserole

[57] ABSTRACT

Emitter assemblies associated with fluid transmitting tubes in greenhouse or field irrigating systems wherein the emitter assembly is constructed about a discharge aperture in the tube and comprises a filter and a retainer therefor. The retainer will generally incorporate a substantially rigid filter overlying cover with fluid discharge passages therein and securing structure for affixing the cover to the tube about the filter.

7 Claims, 29 Drawing Figures

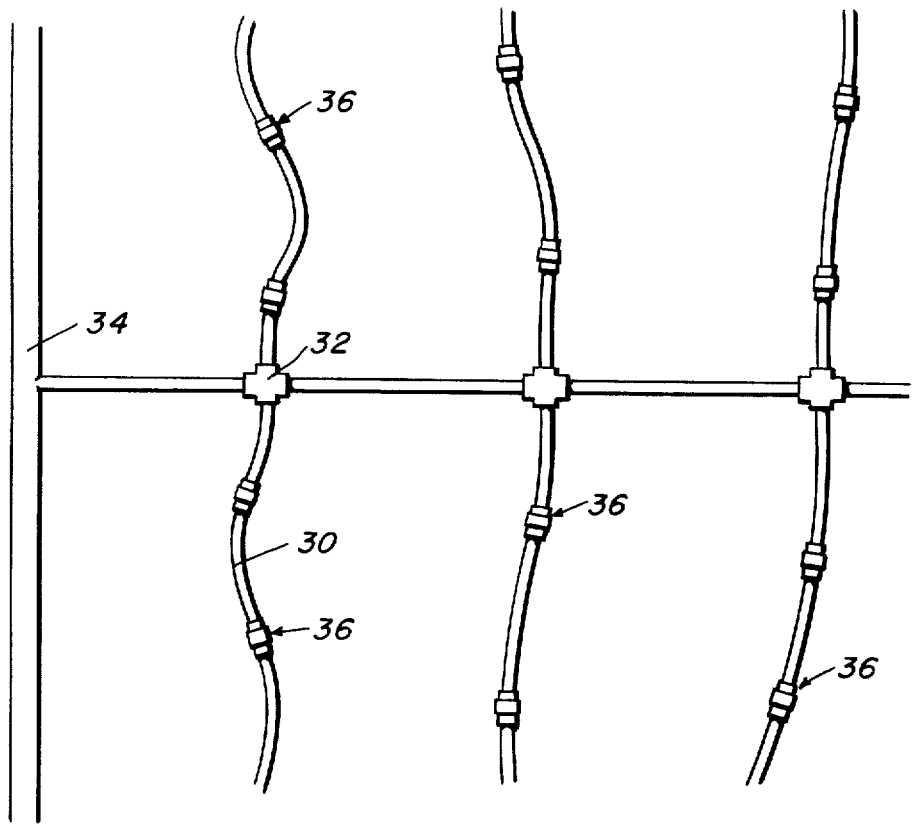
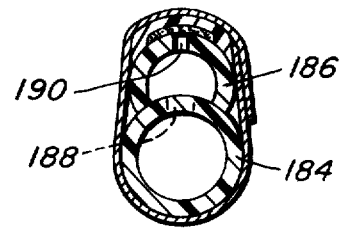
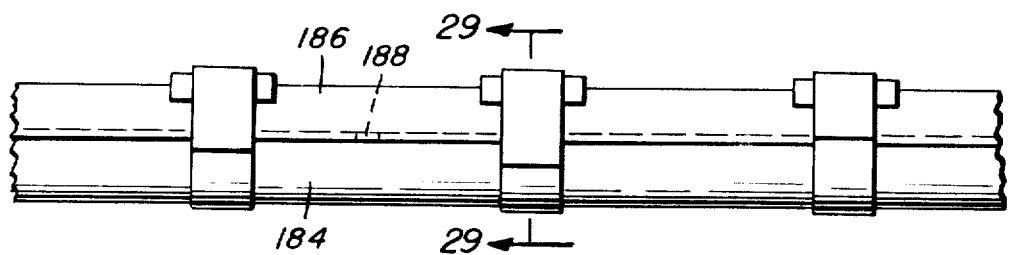

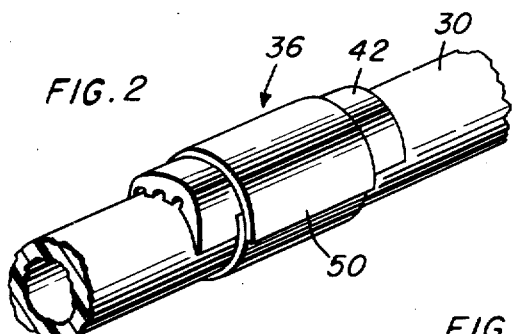
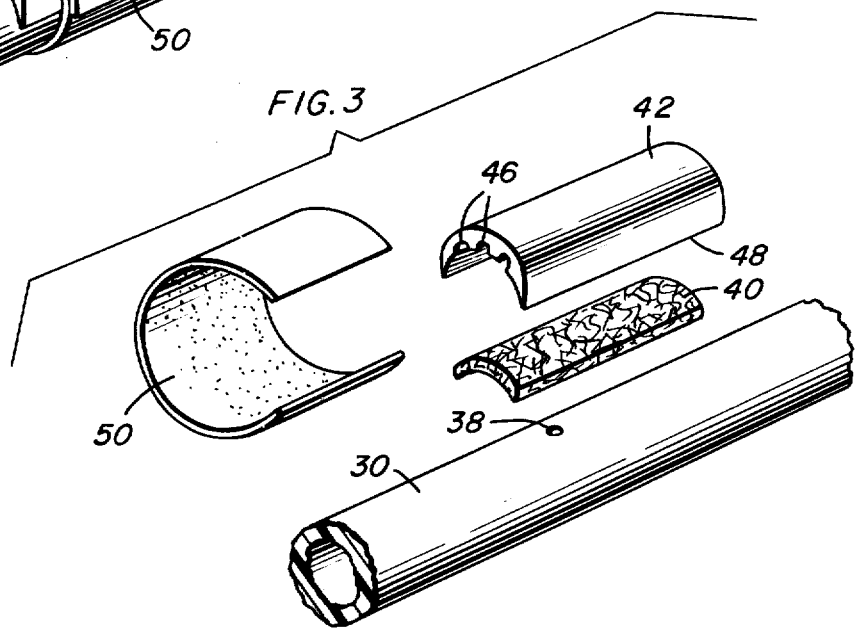
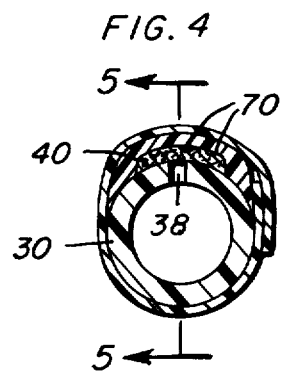
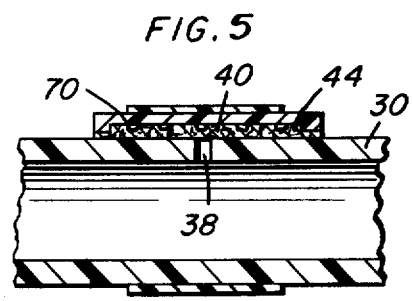
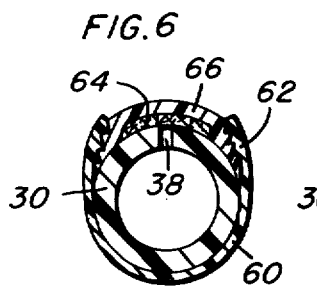
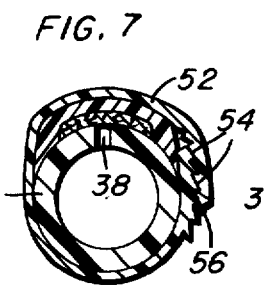
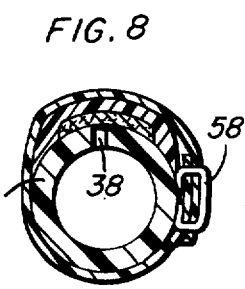
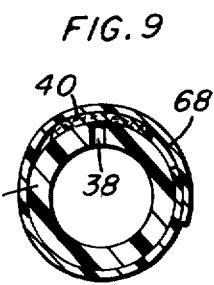

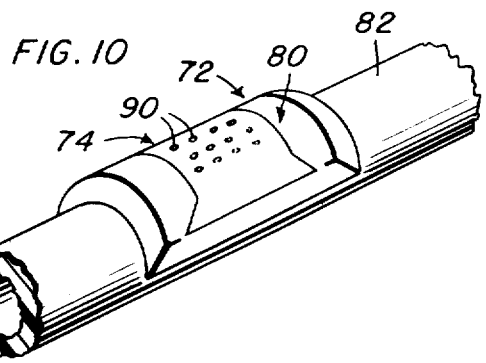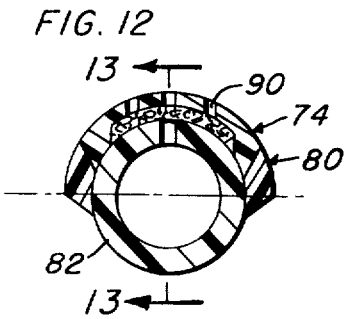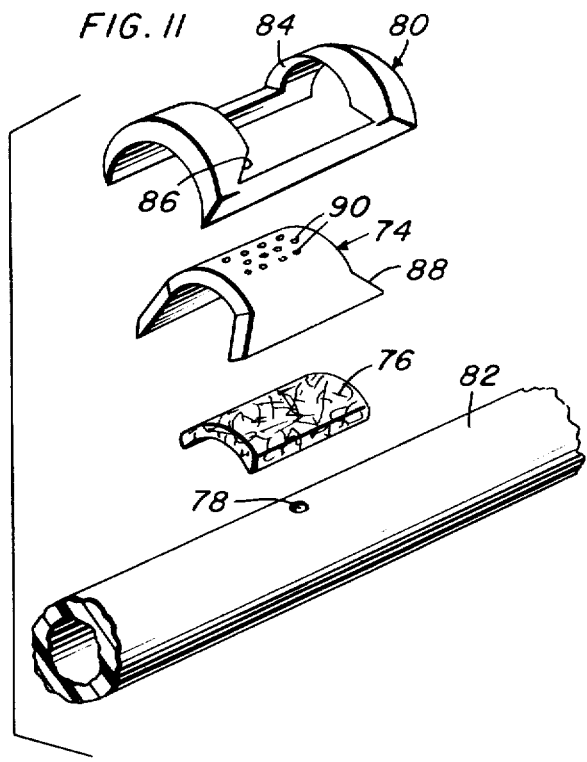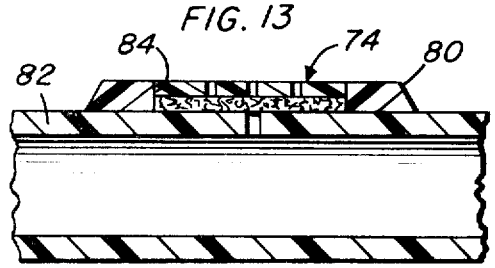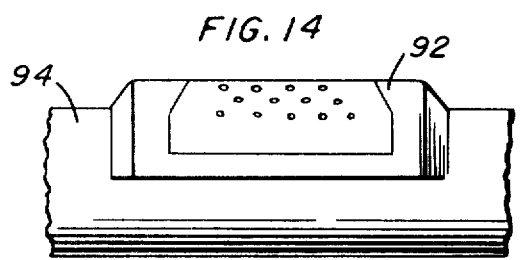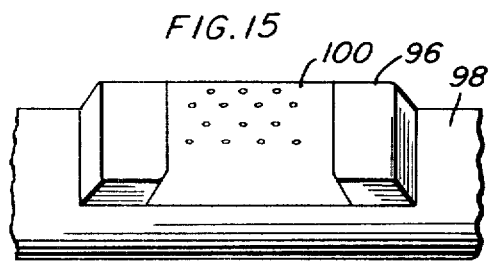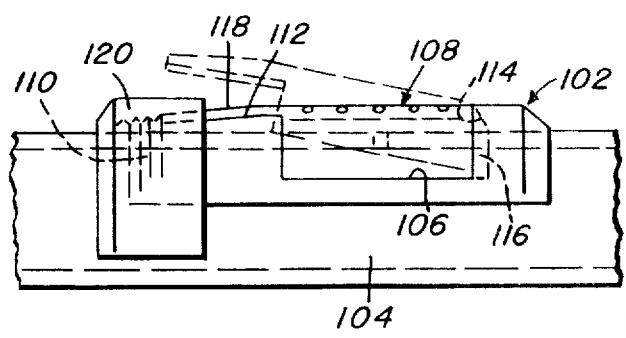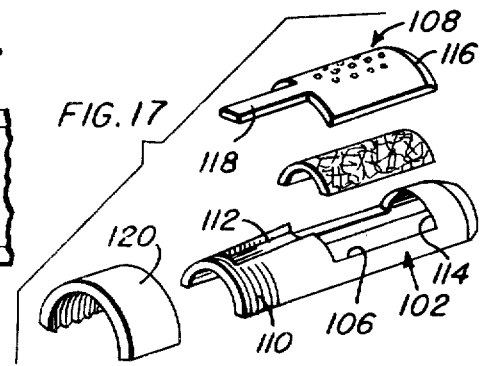

IRRIGATION SYSTEM EMITTERS WITH RENEWABLE FILTERS

The present invention generally relates to long run irrigation systems, and is more particularly directed to emitter assemblies for use in such systems.

In recent years, the tendency in plant irrigation, including large scale field crop irrigation, has been toward a drip irrigation or soil moistening system wherein water is fed to the roots of the plants at a rate generally no faster than the rate at which the roots can absorb the water. The emitters of the present invention are particularly adapted for use in such systems in that a positive slow discharge of water is assured under varying water pressure conditions. This feature is particularly significant in that, utilizing normal pressures on the order of from 10 to 60 psi and conventional tubes of ¼ inch or ⅜ inch, water from a single source can be effectively delivered through several hundred feet of tubing with the slow discharge afforded by the regularly spaced emitters insuring a maintenance of sufficient pressure throughout the length of the tubing.

Another significant object of the invention proposed herein is the incorporation in the emitters of filters or filtering elements which, in addition to assisting to the regulation of the discharge flow, perform a significant function in eliminating ingress of aperture clogging soil particles and the like, while at the same time trapping such contaminants as might be contained in the irrigating fluid itself.

In conjunction with the provision of the filter, the invention proposes the utilization of mounting or securing means therefor specifically devised so as to enable periodic filter replacements both expeditiously and at a minimum cost.

Basically, the emitter assemblies include or are associated with a discharge opening in a fluid carrying tube with the assembly including an aperture overlying filter or filter element and a retainer therefor devised in a manner so as to releasably secure the filter in position and allow for a discharge of fluid at a slow or drip rate. The retaining means will normally incorporate a substantially rigid filter overlying cover defining a chamber for the reception of the filter therein and including fluid discharge passages. The cover in turn will be affixed to the tube by appropriate securing means engaged between the cover and the tube.

These together with other objects and advantages which will become subsequently apparent reside in the details of construction and operation, as more fully hereinafter described and claimed, reference being had to the accompanying drawings forming a part hereof, wherein like numerals refer to like parts throughout, and in which:

FIG. 1 illustrates a typical simplified irrigation system layout which can be utilized incorporating the emitters of the present invention;

FIG. 2 is a perspective view of one form of emitter assembly mounted in operative position on a water or fluid carrying tube;

FIG. 3 is an exploded perspective view of the construction of FIG. 2;

FIG. 4 is a transverse cross-sectional view through the tube mounted emitter assembly of FIG. 2;

FIG. 5 is a longitudinal cross-sectional view taken substantially on a plane passing along line 5—5 in FIG. 4;

FIGS. 6, 7 and 8 are cross-sectional details similar to FIG. 4 illustrating modified forms of cover retaining straps;

FIG. 9 is a cross-sectional detail illustrating a form of emitter assembly wherein the filter element is directly secured by a tube encircling strap without the utilization of a cover;

FIG. 10 is a perspective view of a tube mounted emitter assembly utilizing a tube engaged saddle;

FIG. 11 is an exploded perspective view of the assembly of FIG. 10;

FIG. 12 is a transverse cross-sectional view through the tube mounted assembly of FIG. 10;

FIG. 13 is a longitudinal cross-sectional view taken substantially on a plane passing along line 13—13 in FIG. 12;

FIGS. 14 and 15 illustrate variations of the saddle mounted assembly of FIG. 10;

FIG. 16 illustrates a further form of emitter assembly incorporating a tube mounted saddle and retaining nut;

FIG. 17 is an exploded perspective view of the assembly of FIG. 16;

FIG. 28 illustrates a typical emitter assembly utilized in conjunction with a tube incorporating a main passage and a coextensive reservoir;

FIG. 29 is a cross-sectional detail taken substantially on a plane passing along line 29—29 in FIG. 28.

Figure 18:
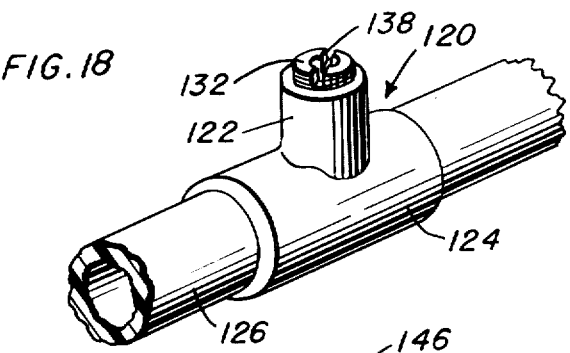
FIG. 18 is a perspective view of a tube coupling tee incorporating an emitter assembly utilizing a replaceable filter releasably retained by a threaded aperture plug.

Referring now more specifically to the drawings, FIG. 1 has been used to designate a typical although simplified tube layout for either greenhouse or field irrigation, the system of the present invention being equally adapted to both. By the same token, the emitters of the invention particularly adapt the system for use either above ground or below the surface. Basically, multiple tubes 30 will branch out, through appropriate fluid transmitting connectors 32, from an enlarged main 34 directly communicated with a source of pressurized fluid. Each of the tubes 30 will in turn mount emitter assemblies 36 through which a direct discharge of the fluid to the soil, normally directly at a plant root system, will be effective.

Referring now to FIGS. 2–5, a basic form of emitter 36 has been illustrated therein. This emitter 36 mounts to the water or fluid carrying tube 30 about a presized aperture of fluid passing opening 38 therein. Initially, a filter or filter element 40, of fiberglass or any other appropriate material, is positioned over the discharge hole 38. The filter 40 is then enclosed by an overlying relatively rigid cover 42 provided with a downwardly directed recessed portion 44 which, in conjunction with the underlying surface of the tube 30, defines an internal chamber for the filter 40. Fluid discharge passages 46 are defined through the opposed ends of the cover 42, communicating the filter chamber with the exterior of the emitter assembly. The opposed side edges 48 of the cover 42 will normally engage against the tube 30 to the opposed sides of the filter element 40. Finally, the cover 42 and enclosed filter 40 are releasably locked to the tube by an encircling strap or tape 50, preferably of an appropriate plastic material. The opposite ends of the tape 50 will normally be adhesively secured or welded to each other, as suggested in FIG. 4, with the replacement of the filter 40 requiring merely a severing of the strap and a replacement thereof with a new strap subsequent to the insertion of a new filter. The ease with which the tape can be severed and replaced, as well as the inexpensive nature of the tape, makes this a highly economical manner of providing for a mounting of replaceable filters.

Alternative means of mounting the retaining strap have been illustrated in FIGS. 7 and 8. In FIG. 7, the strap 52 has been formed with angled teeth 54 on the facing surfaces of the opposed end portions. These teeth are interlockable in the manner of a rachet and can be used to either permanently or temporarily retain the strap 52. Should a more positive retention of the strap be desired, a weld 56 can also be utilized.

FIG. 8 suggests the utilization of a mechanical fastener, clip or the like 58 alone or in conjunction with a subsequent weld.

With reference to FIG. 6, the assembly therein differs slightly in that the retaining strap 60 only partially encircles the tube 30 with the strap 60 at the opposed end portions thereof having inwardly directed angled teeth 62 which engage similarly angled tooth configurations 64 provided along the opposed external sides of the filter retaining cover 66.

In the form of FIG. 9, the cover itself is omitted with the strap 68 directly retaining the filter or filter element 40 over the tube discharge hole or opening 38. In this instance, the opposed ends of the filter 40 are exposed and the fluid is discharged directly therefrom longitudinally along the tube 30.

In all of the above described instances, the filters are easily replaced by merely a severing of the strap and the replacement thereof with a new strap, such constituting both a simple and economical manner of filter replacement.

In those instances wherein a cover, such as 42 and 66, is utilized, the internal recess or chamber formed would be so shaped and of such a size as to leave small internal clearances to insure a proper discharging flow of the filtered water and at the same time allow for slight filter movement to reduce any tendency for the filter to clog. By the same token, should the filter become clogged, the slight clearance will allow for a small movement of the filter away from the discharge hole 38 to allow for a continued flow of water until such time as the filter can be replaced, thus maintaining the overall operability of the system. Such clearances can be provided by the utilization of small projections 70 extending into the filter chamber, as suggested in FIGS. 4 and 5.

In view of the manner in which the above described emitter assemblies are mounted through the use of a flexible retaining strap or tape, it will be appreciated that the degree of compression of the filter can be varied, the covers themselves flexing slightly for this purpose. By so varying the compression of the filters, the actual rate of flow from the emitters can be regulated as required under particular circumstances.

Referring now specifically to FIGS. 10 through 13, the emitter assembly 72 illustrated therein utilizes a slightly flexible plastic cover forming insert 74 in overlying relation to the filter or filter element 76 which in turn overlies the tube discharge hole 78. The cover 74 is releaseably retained within a tube mounted saddle 80. The saddle 80 is of an arcuate configuration extending through an arc of greater than 180° for a snap locking thereof to the tube, herein designated by reference numeral 82. Once mounted in this manner, the saddle 80 can be permanently welded or otherwise affixed to the tube 82. The saddle includes an arcuate central recess 84, the opposed sides of which are provided with lateral dovetailed uncut portions 86. The cover or insert 74 is shaped so as to conform to the saddle recess 84 and fit closely therein. As such, the opposed sides of the arcuate cover 74 include laterally projecting portions 88 which engage within the saddle recesses 86. Thus, in mounting the cover 74, the cover 74 is pressed downwardly on the saddle with the projecting portions 88, through a slight flexing of the cover 74, riding along outer surface of the saddle 80 and dropping into the recesses 86 upon alignment therewith. With such a construction, it will be appreciated that replacement of the filter or filter elements 76 will merely require a temporary snapping off of the cover 74 utilizing an appropriate sharp instrument to outwardly flex the cover sufficiently so as to enable its withdrawal from the saddle. Incidentally, a discharge of the water through the cover 74 is effected through multiple discharge openings or passages 90 through the top surface thereof.

It is contemplated that the cover 74, through the slightly domed configuration thereof, provides an internal chamber for the filter 76. If so desired, internal projections similar to the previously described projections 70 can be utilized in order to provide for slight movement of the filter for self-cleaning purposes.

FIG. 14 illustrates a variation of the saddle mounted form of emitter wherein the saddle and cover interlock is slightly modified. Further, as suggested in FIG. 14, the saddle 92 actually need not extend beyond the central line of the tube 94 in those instances wherein a positive chemical weld or the like is to be utilized in affixing the saddle 92 to the tube 94.

FIG. 15 illustrates another variation wherein the saddle 96 is formed of two independent end pieces, each separately connected to the tube 98 for the reception of the cover forming insert 100 therebetween utilizing the same snap-on locking features as described in conjunction with the cover 74.

FIGS. 16 and 17 illustrate a modified form of saddle mounted emitter wherein specific provision is made for adjustment of the compressive forces on the filter which in turn will accurately control the fluid discharge rate.

In connection therewith, the tube mounted saddle 102, affixed to the tube 104 normally by a combination of a snap mounting and a chemical weld, includes a central recess 106 within which the filter cover 108 mounts. One end of the saddle 102 tapers downwardly and outwardly toward the surface of the tube 104 and terminates in a threaded end 110. An elongated central slot 112 extends from the cover receiving recess 106 into this threaded end portion 110 terminating a short of the extreme end of the saddle. The opposite end of the recess 106 is provided with a beveled undercut portion 114. The cover 108, along the end thereof corresponding with the undercut portion 114 of the recess 106, is beveled as 116 so as to generally conform to the recess bevel 114 for reception therein. The opposite end of the cover 108 is provided with a centrally located outwardly projecting elongated extension 118 receivable within the saddle slot 112. Thus, in assembling the emitter of FIGS. 16 and 17, the saddle 102 is affixed, normally permanently, to the tube 104. The filter is then positioned over the tube discharge opening within the saddle recess 106. Next, the beveled end 116 of the cover 108 is introduced into the undercut beveled portion 114 of the recess 106 and the cover 108 pivoted downward so as to position the extension 118 within the saddle slot 112. At this point a nut 120, positioned over the threaded end 110 of the saddle 102, is threaded inward thereon so as to overlie and retain the cover extension 118, thereby locking the cover 108 and the retained filter to the saddle 102 and tube 104. It is contemplated that the leading end of the nut 120 be of a tapered internal configuration whereby a progressive inward threading thereof on the threaded end portion 110 of the saddle will result in a progressive downward forcing of the saddle extension 118. This in turn will, as the nut 120 moves inward, increase the compressive force on the filter and thus vary the porosity thereof and the flow of water therethrough.

In order to simplify the mounting of the nut 120, it will be noted that it is in fact a split nut with the inherent resiliency of the material thereof enabling a snap mounting of the nut 120 over the tube mounted threaded end portion 110. Once snapped into position, the nut 120 can be rotated in the manner of a conventional nut through the threading engagement thereof with the saddle end portion 110.

The cover 108, as with the previously described saddle mounted covers, incorporates a series of liquid passages therethrough for the utlimate discharge of the water.

Figure 19:
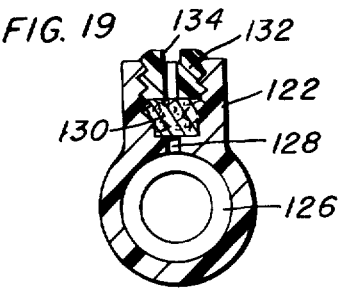
FIG. 19 is a transverse cross-sectional detail of the construction of FIG. 18.

Attention is now directed to FIGS. 18 and 19 wherein the emitter 120 is incorporated into the branch line 122 of a tube coupling tee 124. The branch line 122 is communicated with the tube or tubes 126 through an appropriate water passing opening 128 with the filter or filter element 130 being received internally within the branch line 122 over the opening 128. The filter 130 is retained by a centrally apertured plug 132 internally threaded within the open end of the branch line 122. As will be appreciated, the depth of insertion of the plug 132 can be varied so as to effect a variation in the compressor force on the filter 130. This in turn will vary the rate of discharge flow through the emitter assembly 120, flow of course exiting through the aperture in the removable filter retaining plug 132. In order to facilitate removal of the plug 132 for replacement of the filter 130 as desired, an appropriate tool receiving kerf 134 can also be provided in the outer end thereof.

Figure 20:
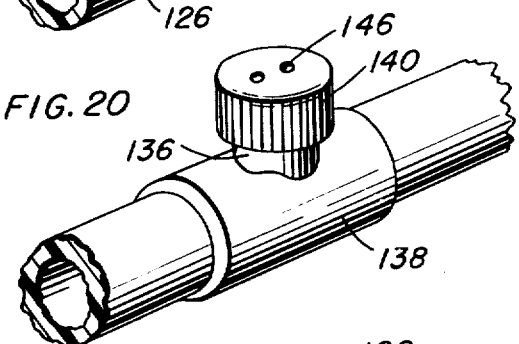
FIG. 20 is a perspective view of a tube coupling tee incorporating an emitter assembly utilizing a filter retaining apertured cap.
Figure 21:
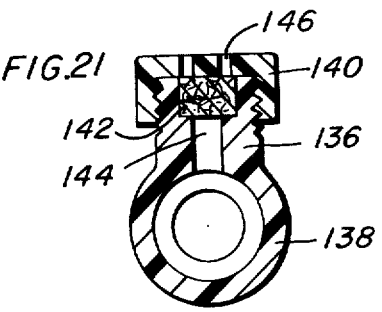
FIG. 21 is a cross-sectional detail of the construction of FIG. 20.

FIGS. 20 and 21 illustrate a variation of the emitter assembly 120 wherein the branch line 136 of a tee coupling 138 has the discharge end portion thereof externally threaded for the reception of a filter retaining cap 140.

The filter 142 will seat within branch line 136 of the coupling tee 138 over the tube communicated discharge opening 144. The retaining cap 140 itself will include one or more liquid discharging passages 146.

Figure 22:
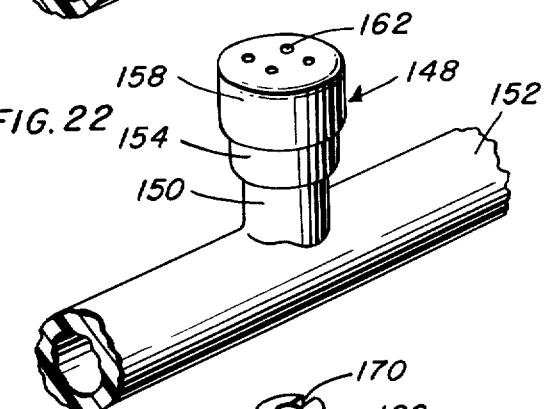
FIG. 22 illustrates a tube branch line incorporating a cap retained filter emitter assembly on the discharge end thereof.
Figure 23:
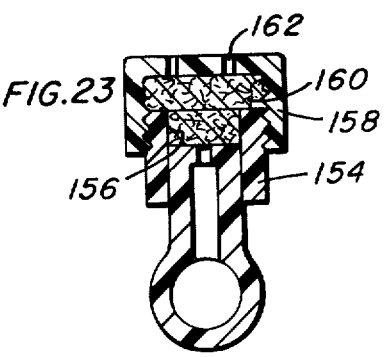
FIG. 23 is a cross-sectional detail of the construction of FIG. 22.

FIGS. 22 and 23 illustrate another emitter assembly 148 mounted on the discharge end of a branch line 150 integrally formed with a water carrying tube 152. As will be appreciated, this branch line 150 can be of any appropriate length from a short upstanding projection, as illustrated, to several feet or more depending upon where the emitter 148 is to be located. In this form, a mounting sleeve 154 is affixed to the discharge end of the branch line 150 with the sleeve projecting longitudinally outward therefrom so as to define a filter receiving chamber 156. The outer end portion of the sleeve 154 is externally threaded for the mounting of a cover forming cap 158 thereover. The cap, of course, replaceably retains the filter or filter element 160 and is provided with water discharging passages 162 therethrough. Further, as will be appreciated from FIG. 23, the degree of compression of the filter 160 can be varied by an adjustment of the position of the cap 158 through the threaded engagement thereof with the sleeve 154. This in turn will vary the permeability of the filter 160 and the flow discharge rate.

Figure 24:
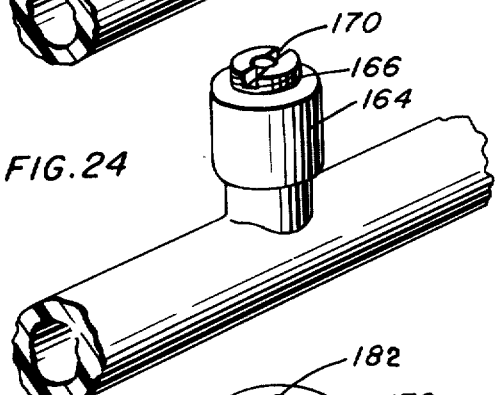
FIG. 24 is a perspective view of a branch line mounted emitter assembly incorporating a filter retaining apertured discharge plug.
Figure 25:
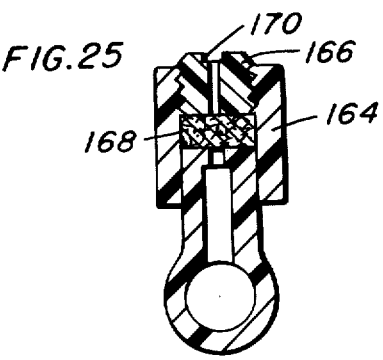
FIG. 25 is a cross-sectional detail of the construction of FIG. 24.

FIGS. 24 and 25 illustrate a variation of the emitter wherein the branch line mounted sleeve 164 is internally threaded for the reception of an apertured externally threaded filter retaining plug 166. As with the previously described plug 132, an adjustment of the plug 166 will vary the compression of the filter 168 so as to vary the discharge flow rate with the plug 166, through the tool accommodating kerf 170 in the upper end thereof, being easily removable for replacement of the filter 168.

Figure 26:
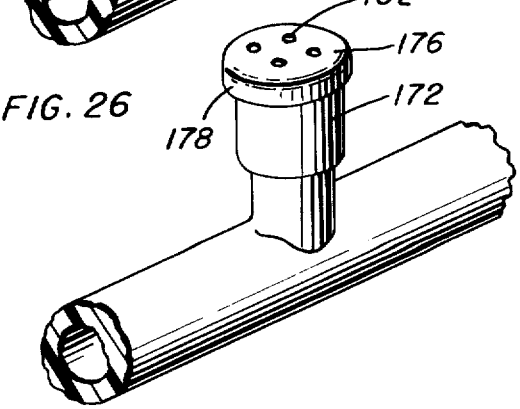
FIG. 26 illustrates another form of branch line mounted emitter assembly wherein a snap-on retaining cap is used to releasably secure the filter.
Figure 27:
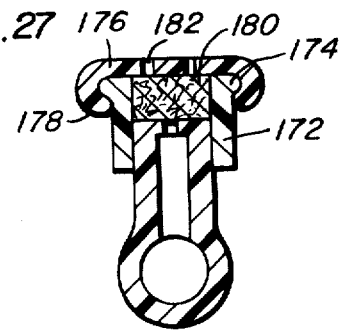
FIG. 27 is a cross-sectional detail of the construction of FIG. 26.

FIGS. 26 and 27 illustrate a branch line emitter with the branch line mounted sleeve 172 provided with a peripheral head 174 about the upper end thereof which in turn receives and mounts a snap locking cap 176 provided with a reversely turned bead engaging edge 178. It is, of course, contemplated that the cap 176 be easily snap removed from the mounting sleeve 172 for a replacement of the sleeve containing filter 180. In addition, the cap 176 of course incorporates the appropriate water discharging passages 182.

With regard to all of the above described branch line mounted emitters, it is to be recognized that while threaded connections have primarily been discussed, other coupling means can be utilized including progressive camming interlocks which will provide for a varying of the compressor forces on the filters through an easily effected simple manipulation of the cover.

Referring now to FIGS. 28 and 29, these figures are intended to illustrate the feasibility of adapting any of the above described emitters to a liquid carrying tube 184 provided with a full length communicated reservoir 186. Such an arrangement is normally utilized in conjunction with extremely long runs with one fluid passing hole 188 communicating the main tube 184 and reservoir 186 for each group of several water discharging emitter covered holes 190 exiting from the reservoir 186. In this manner, the pressure can be maintained throughout the length of the system regardless of whether the terrain is flat or rolling with the emitters themselves regulating the actual discharge from the reservoir tube 186.

From the foregoing, it will be appreciated that emitters of a highly distinctive construction have been devised, such emitters being particularly adapted for use in drip irrigation systems. The emitters, in each instance, incorporate a liquid discharge filtering and regulating element mounted in a manner so as to enable an easy replacement thereof at such time as the filter element becomes clogged. In this manner, the operability of the overall irrigation system can be maintained at peak efficiency. As will be appreciated, filter replacement on above ground installations will be a relatively simple procedure. With subsurface installation, as also contemplated by the present invention, it will of course be necessary to initially expose the tubes prior to a replacement of the filters. This can be effected utilizing conventional equipment to "plow out" the tube and either subsequently "plow in" the same tube or another tube wherein the filters have already been replaced.

The nature of composition of the filters themselves can be varied as dictated by particular circumstances. By the same token, the porosity of any chosen filter can be varied by the compressive force applied thereto through the filter retaining means utilized to mount the filter on the tube. This in turn will regulate the rate of discharge of the water from the tube.

The foregoing is considered to be illustrative of the principals of the invention. Further, since numeral modifications and changes will readily occur to those skilled in the art, it is not desired to limit the invention to the exact construction and operation shown and described, and accordingly, all suitable modifications and equivalents may be resorted to, falling within the scope of the invention as claimed.

I claim:

1. In an irrigation system, a fluid conducting tube, a fluid discharge opening laterally through said tube from the interior thereof, an emitter assembly associated with said opening, said emitter assembly comprising a filter overlying the opening and selectively removable filter retaining means releasably affixed to the tube and overlying the filter in a manner so as to retain the filter over the tube opening, said filter retaining means including a substantially rigid filter cover with opposed sides freely engaging the tube to the opposite sides of the filter, the cover, between the opposed sides, being outwardly spaced from the tube and defining a chamber for the reception of the filter, and a cover securing member engaging the cover and freely encircling the tube and releasably clamping the cover to the tube, said cover securing member being readily severable for release of the cover from the tube, said cover chamber being of a size, relative to the filter, so as to allow limited movement of the filter within the chamber to effect a self-cleaning action under the force of discharge fluid.

2. In an irrigation system, a fluid conducting tube, a fluid discharge opening laterally through said tube from the interior thereof, an emitter assembly associated with said opening, said emitter assembly comprising a filter overlying the opening and selectively removable filter retaining means releasably affixed to the tube and overlying the filter in a manner so as to retain the filter over the tube opening, said filter retaining means including a substantially rigid filter cover with opposed sides engaging the tube to the opposite sides of the filter, the cover, between the opposed sides, being outwardly spaced from the tube and defining a chamber for the reception of the filter, and a cover securing member engaging the cover and the tube and releasably fixing the cover to the tube, said cover having fluid outlet passages defined therethrough, said securing member comprising a tube mounted saddle, a central recess defined in said saddle, said cover being of substantially equal size with said recess and receivable therein, said recess and said cover incorporating complementary interlocking portions for a retention of the cover.

3. The construction of claim 2 wherein said saddle is of an arcuate configuration greater than 180°, said saddle being slightly flexible and snap lockable to the tube about a major portion thereof.

4. The construction of claim 2 including adjustment means on said saddle, said cover including an extension thereon engageable with said adjustment means whereby adjustment of said adjustment means effects a clamp locking of the cover extension to the saddle.

5. In an irrigation system, a fluid conducting tube, a fluid discharge opening laterally through said tube from the interior thereof, an emitter assembly associated with said opening, said emitter assembly comprising a filter overlying the opening and selectively removable filter retaining means releasably affixed to the tube and overlying the filter in a manner so as to retain the filter over the tube opening, said filter retaining means including a substantially rigid filter cover with opposed sides freely engaging the tube to the opposite sides of the filter, the cover, between the opposed sides, being outwardly spaced from the tube and defining a chamber for the reception of the filter, and a cover securing member engaging the cover and freely encircling the tube and releasably clamping the cover to the tube, said cover securing member being readily severable for release of the cover from the tube, said filter being compressible with variable porosity in accordance with the degree of compression of the filter, said cover incorporating a slight degree of resilient flexibility, said cover securing member, in engaging the cover and encircling the tube, being adjustable to effect a predetermined compression of the filter.

6. In an irrigation system, a fluid conducting tube, a fluid discharge opening laterally through said tube from the interior thereof, an emitter assembly associated with said opening, said emitter assembly comprising a filter overlying the opening and selectively removable filter retaining means releasably affixed to the tube and overlying the filter in a manner so as to retain the filter over the tube opening, said filter retaining means including a substantially rigid filter cover, said cover defining a chamber for the reception of the filter, cover securing means, said cover securing means comprising a tube mounted member, said tube mounted member defining a central recess, said cover covering said recess to define said filter receiving chamber, said member and said cover incorporating complementary interlocking portions for a retention of the cover.

7. The construction of claim 6 wherein said filter is compressible with variable porosity in accordance with the degree of compression, said complementary interlocking portions being adjustable and enabling an adjustment of the cover relative to the recess and a resultant variation in the degree of compression of the filter in a manner so as to vary the porosity thereof.

* * * * *